Nov. 14, 1950

M. A. STARR 2,529,823

PLAN POSITION INDICATOR

Filed May 9, 1945

*INVENTOR.*
MERLE A. STARR

BY
Ralph L. Chappell
ATTORNEY

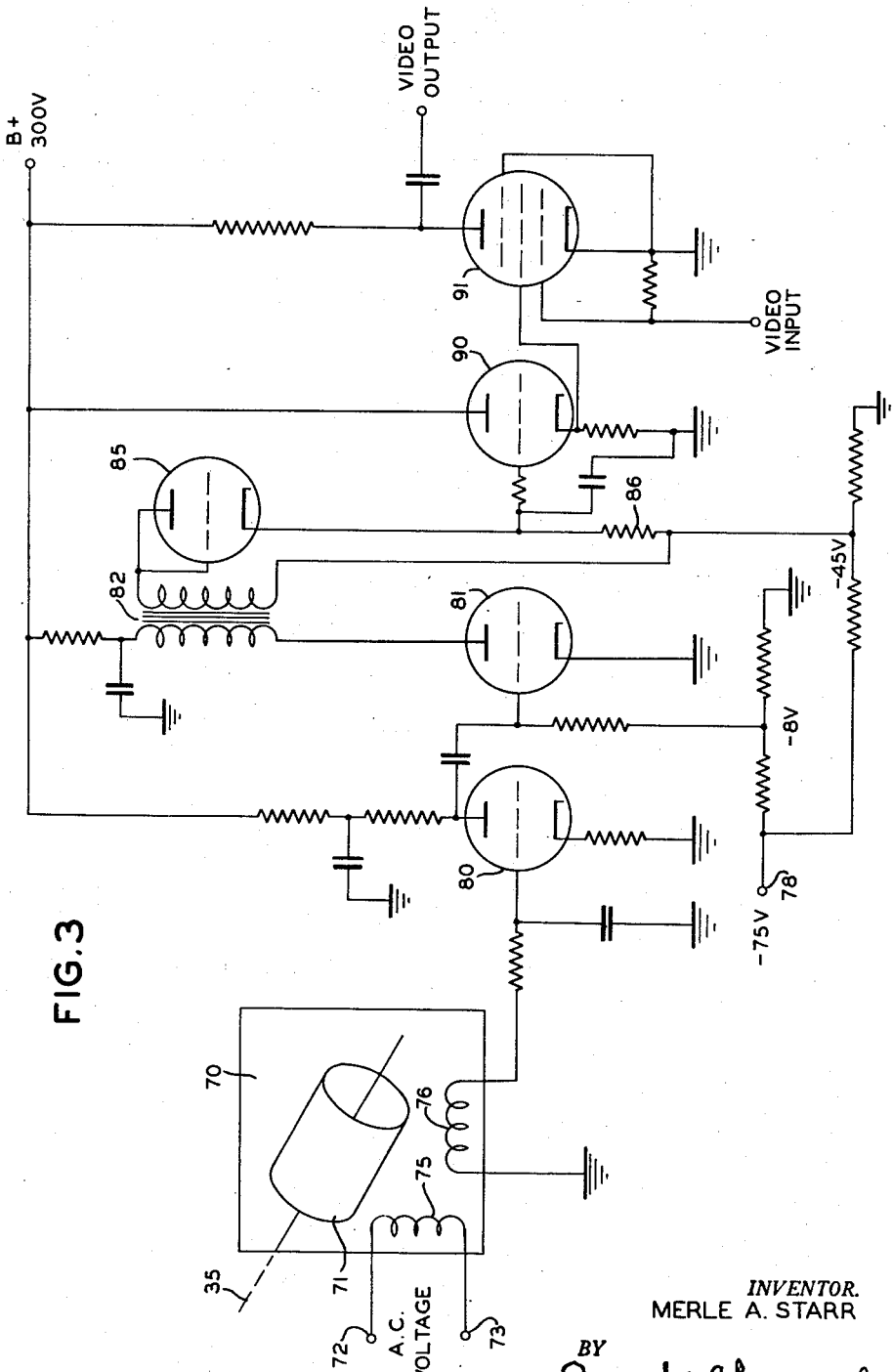

Patented Nov. 14, 1950

2,529,823

UNITED STATES PATENT OFFICE 2,529,823

PLAN POSITION INDICATOR

Merle A. Starr, Belmont, Mass., assignor, by mesne assignments, to the United States of America as represented by the Secretary of the Navy Application May 9, 1945, Serial No. 592,799

7 Claims. (Cl. 343—118)

This invention relates to a means for stabilizing the trace intensity on a cathode ray tube, and in particular to a means for stabilizing this intensity against fluctuations which would otherwise occur due to changes in the speed of movement of the trace over the screen of the tube.

In a radar system using a plan position indicator for data presentation the trace of the sweeping electron beam appears as a line extending substantially from the center to the circumference of the cathode ray tube screen. This line rotates about the center in synchronism with the spinner or rotatable antenna. Since the intensity of illumination is dependent on the duration of time the electron beam is applied, there being more sweeps per unit area with a longer time, it follows that the intensity of illumination varies inversely as the speed of rotation of the trace or the spinner movable with the trace. As the spinner speed decreases, the intensity of illumination will increase, there being more sweeps per unit area on the screen. Conversely, as the spinner speed increases, the intensity of illumination will decrease, there being fewer sweeps per unit area on the screen. This invention overcomes this difficulty by generating a voltage whose magnitude is dependent on the speed of rotation of the signal trace, and then utilizing this voltage to so control the gain of the radar receiver that incoming signals will be amplified more with increasing speed, and less with decreasing speed until finally no signal would appear on the screen with zero speed.

It is an object of this invention to provide a means to stabilize the signal trace intensity of a cathode ray tube.

It is a further object of this invention to provide a means to stabilize the signal trace intensity of a cathode ray tube against fluctuations due to changes in the speed of movement of the trace over the screen.

It is a further object of this invention to provide a means for varying the gain of a radar receiver inversely with the speed of movement of the signal trace over the screen of the cathode ray tube.

Other objects and features of the present invention will become apparent upon a careful consideration of the following detailed description when taken together with the accompanying drawings the figures of which illustrate typical embodiments of the invention, wherein:

Fig. 3 is a circuit diagram of a modified form of the portion disclosed in Fig. 2.

Figure 1:
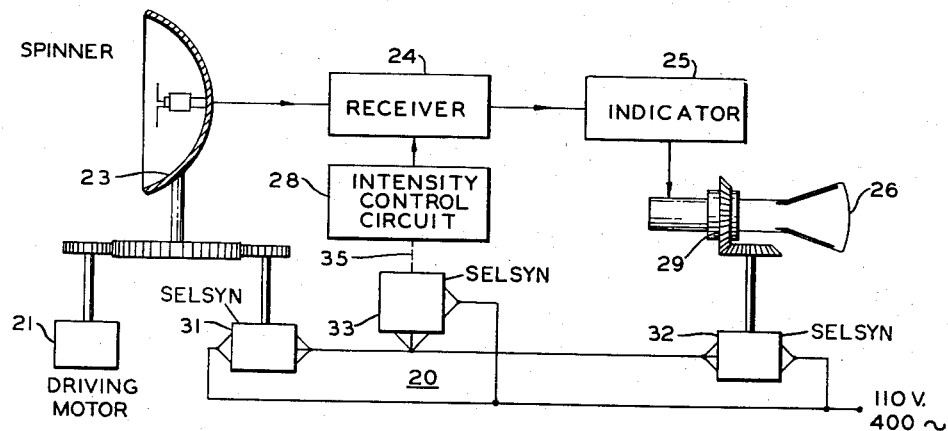
Fig. 1 is generally a block diagram of a radar receiving system incorporating the invention.

Referring now to the diagram in Fig. 1, a spinner or antenna 23 is rotated through a train of gears at a desired speed and in a desired direction by a driving motor 21. A yoke 29 which carries the deflecting coils for producing the sweep on a cathode ray tube 26 is rotated in synchronism with antenna 23 by any suitable means. Here the well known Selsyn system generally indicated by numeral 20 has been selected. This system consists generally of two Selsyns 31 and 32 having their rotors connected through suitable gearing to antenna 23 and yoke 29, respectively. The rotors are electrically connected by the usual three wires, and the stators are fed by the customary 110 volts 400 cycle A. C. voltage. The signals received by the spinner pass through a receiver 24 and into an indicator 25 where they produce an indication on the screen of a scope 26.

A third Selsyn 33 is shown connected to move in synchronism with Selsyns 31 and 32. The rotation of the rotor of Selsyn 33 is transmitted through a suitable linkage indicated here by a dotted line 35 to an intensity control circuit 28. This circuit produces a voltage depending on the speed of rotation of the rotor of Selsyn 33, which is utilized to control the gain of receiver 24.

Figure 2:
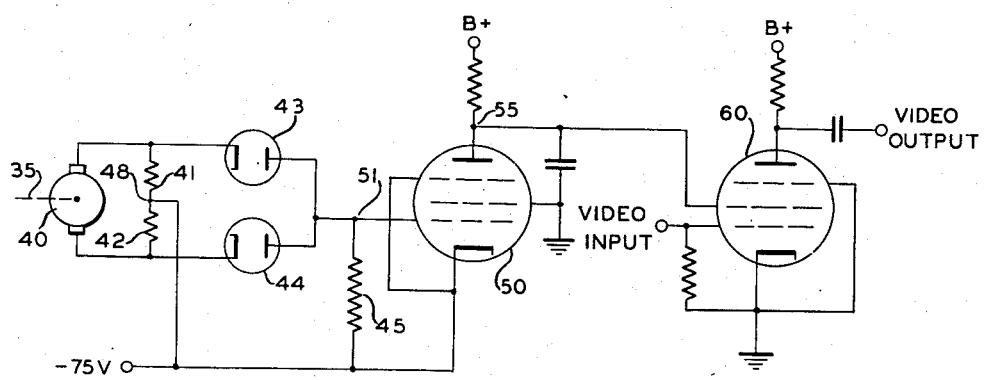
Fig. 2 is a circuit diagram of a portion of the diagram of Fig. 1.

Referring now to Fig. 2, there is disclosed a circuit diagram of intensity control circuit block 28 of Fig. 1 with an associated video amplifier of receiver 24. A small direct current generator 40 has its armature rotated through linkage 35 in accordance with the rotation of the antenna. The voltage generated by this generator will be therefore proportional to the speed of rotation of the spinner. The voltage drop across resistors 41 and 42 will be either positive or negative depending upon the direction of rotation of the generator armature. A voltage drop through resistor 42 from mid-point 48 will produce current through diode 44 to cause the voltage across resistor 45 to drop at 51 with respect to mid-point 41. Likewise, a voltage drop through resistor 41 from mid-point 48 will produce a current through diode 43 to cause the voltage across resistor 45 to drop at 51 with respect to mid-point 40 regardless of the direction of rotation of the armature of generator 40.

A pentode tube 50 has its grid and cathode connected across resistor 45, the grid being connected at point 51. The screen grid is maintained at ground potential, and the cathode negative with respect thereto, say 75 volts. Plate voltage is applied to the anode at 55 through the usual plate resistor. An increase in negative bias on the grid at 51 with respect to the cathode of tube 50 results in an increase in the voltage at 55 due to less current flowing through the plate resistor. Since point 55 is connected directly to the screen grid of video amplifier tube 60, the gain of this tube will be increased. Since the video signal passes through this tube from control grid to anode in conventional manner, the video signal to cathode ray tube 26 will be increased. Consequently the intensity of the signal impressed on the cathode ray tube will be increased as the spinner speed increases and in a similar manner, the signal intensity will be decreased with a decrease in spinner speed. This results in signals of more uniform intensity appearing on the cathode ray tube screen than would otherwise appear with variations in spinner speed.

The limiting case is when the spinner stops completely. Ordinarily this occurrence causes an intensely illuminated line to form on the cathode ray tube screen. This line due to its high intensity of illumination is very persistent. With the present invention, if the antenna stops, there is zero bias on the grid at 51 with respect to the cathode of tube 50. This causes the potential at 55 to drop to a minimum, and this minimum is sufficiently low to cut tube 60 off completely. No signals will now be passed to the cathode ray tube, and no lines due to signals will be formed on the screen.

Referring now to Fig. 3, there is disclosed a circuit diagram of a modified form of intensity control circuit block 28 of Fig. 1 with an associated video amplifier of receiver 24. Here a drag cup motor is operated as a generator, indicated generally at 70, to convert the spinner rotation to alternating voltage. The shaft of this generator is connected through linkage 35 to rotate approximately 100 times faster than the spinner. A source of alternating voltage is fed through terminals 72 and 73 to a coil. The field of this coil in cooperation with a cup 71, rotatable with the generator shaft, induces an alternating voltage in coil 76, whose amplitude is dependent on the rotation of cup 71. This alternating voltage is fed to the grid of an amplifier tube 80. The output of amplifier tube 80 is fed to a second amplifier tube 81. The alternating output of tube 81 is passed through a transformer 82, and the output of this transformer is rectified by tube 85 to produce a voltage drop across resistor 86. The more positive side of resistor 86 is connected through a suitable limiting resistance to the grid of a cathode follower tube 90. It is apparent that an increase in the speed of rotation of the shaft of generator 70 will increase the flow of current through resistor 86 to bias the grid of tube 90 less negatively and vice versa. Furthermore, this will occur regardless of the direction of rotation of the shaft, since the direct current through tube 85 is dependent only on the amplitude of the alternating wave impressed thereon.

The output of cathode follower 90 is applied to the screen grid of video amplifier tube 91. Thus the receiver gain here varies with the speed of rotation of the spinner as in the embodiment disclosed in Fig. 2, and the illumination of the cathode ray tube due to signals is stabilized against changes in the rate of rotation of the spinner.

Instead of varying the gain of a video stage to change the signal amplitude applied to the scope, the control grid of the cathode ray tube may be connected to point 55. With this arrangement, the video signals are constant for all antenna speeds, but the beam of the cathode ray tube is varied. The illustrated embodiments are to be preferred, however, since they are more sensitive for weak signals. It is to be understood that the armature shaft of generators 40 or 70 may be connected in any convenient manner. This shaft may be mechanically linked to the spinner or the rotating yoke of the cathode ray tube.

Numerous additional applications of the above disclosed principles of the invention will occur to those skilled in the art and no attempt has been made here to exhaust such possibilities. The scope of the invention is defined in the following claims.

I claim:

1. A radar receiving system, including a rotatable antenna for receiving signals, a means for amplifying said signals, a cathode ray tube connected to be illuminated by the amplified signals, means for producing a voltage whose magnitude depends on the rate of rotation of said antenna, a means for controlling the gain of said amplifying means and being so connected to said voltage producing means that the signal illumination intensity of said cathode ray tube will remain substantially unchanged during changes in the rate of rotation of said antenna.

2. A radar receiving system, including a rotatable antenna for receiving signals, means for amplifying said signals, a cathode ray tube connected to be illuminated by the amplified signals, a generator connected to produce at its output a voltage whose magnitude depends on the rate and direction of rotation of said antenna, a circuit connected to said output for producing a voltage whose magnitude depends on the magnitude of said output voltage, and means for controlling the gain of said amplifying means, the output of said circuit being so connected to said gain control means that the signal illumination intensity of said cathode ray tube will remain substantially unchanged during changes in the rate of rotation of said antenna.

3. A radar receiving system, including a rotatable antenna for receiving signals, a means for amplifying said signals, a cathode ray tube connected to be illuminated by said amplified signals, a direct current generator whose armature is connected to rotate in synchronism with said antenna to produce an output voltage depending on the rate and direction of antenna rotation, a vacuum tube, a resistance across the output of said generator, the mid-point of said resistance being negatively biased and connected to the cathode of said vacuum tube, two diode rectifier tubes, the ends of said resistance each being connected to the cathode of one of said rectifier tubes, the anodes of said rectifier tubes being each connected to the grid of said vacuum tube, a resistance connecting the grid and cathode of said vacuum tube, a pentode tube in said amplifying means, the screen grid of said pentode tube being connected to the anode of said vacuum tube, whereby the gain of said amplifying means may be varied in accordance with the rate of rotation of the armature of said generator.

4. A radar receiving system, including a rotatable antenna for receiving signals, means for amplifying said signals, a cathode ray tube connected to be illuminated by said amplified signals, a drag cup motor connected to operate as a generator to produce an alternating voltage output whose amplitude depends on the rotation of its cup, means whereby said cup is rotated with said antenna, an amplifier connected to the output of said motor, a rectifier tube and resistor in series connected to the output of said amplifier to produce a direct voltage drop across said resistor depending on the amplitude of the output of said amplifier, a cathode follower tube having its grid potential variable with said voltage drop, a pentode tube in said amplifying means having its screen grid connected to the output of said cathode follower tube, whereby the gains of said amplifying means may be varied in accordance with the rate of rotation of said antenna to stabilize the signal illumination of said cathode ray tube.

5. A radar receiving system, including a rotatable antenna for receiving signals, a cathode ray tube connected to be illuminated by said signals, means for producing a voltage whose magnitude depends on the rate of rotation of said antenna, and means responsive to said voltage producing means and connecting said voltage producing means to said cathode ray tube for maintaining substantially constant signal illumination intensity of said cathode ray tube during changes in the rate of rotation of said antenna.

6. A radar receiving system, including a rotatable antenna for receiving signals, means for amplifying said signals, a cathode ray tube connected to be illuminated by said signals, a generator rotatable with said antenna for producing an alternating voltage proportional in amplitude to the speed of rotation of said antenna, rectifying means connected to the output of said generator to produce a direct voltage proportional to said alternating voltages, and means for controlling the gain of said amplifying means, said gain control means being so connected to said rectifying means that the signal illumination intensity of said cathode ray tube will remain substantially unchanged during changes in the rate of rotation of said antenna.

7. A radar receiving system, including a rotatable antenna for receiving signals, means for amplifying said signals, a cathode ray tube connected to be illuminated by said signals, an alternating voltage generator rotatable with said antenna to produce a voltage whose amplitude depends on the speed of rotation of said antenna, a rectifier and resistor in series connected to the output of said generator to produce a direct voltage drop across said resistor proportional to the output of said generator, and means for controlling the gain of said amplifying means, said gain control means being so connected to said resistor that the signal illumination intensity of said cathode ray tube will remain substantially unchanged during changes in the rate of rotation of said antenna.

MERLE A. STARR.

REFERENCES CITED

The following references are of record in the file of this patent:

UNITED STATES PATENTS

| Number | Name | Date |
|---|---|---|
| 2,078,644 | Sevedlund | Apr. 27, 1937 |
| 2,168,045 | Pock | Aug. 1, 1939 |
| 2,395,966 | Goldberg | Mar. 5, 1946 |